(12) United States Patent
Gardner

(10) Patent No.: US 7,781,751 B2
(45) Date of Patent: *Aug. 24, 2010

(54) PORTABLE WAVELENGTH TRANSFORMING CONVERTER FOR UV LEDS

(75) Inventor: William G. Gardner, Glendale, AZ (US)

(73) Assignee: William G. Gardner, III, Glendale, AZ (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/027,270

(22) Filed: Feb. 7, 2008

(65) Prior Publication Data

US 2008/0290301 A1    Nov. 27, 2008

Related U.S. Application Data

(63) Continuation of application No. 11/483,931, filed on Jul. 10, 2006, now Pat. No. 7,485,883.

(60) Provisional application No. 60/888,755, filed on Feb. 7, 2007.

(51) Int. Cl.
*A61N 5/06* (2006.01)
*G01J 3/10* (2006.01)
*H05G 2/00* (2006.01)

(52) U.S. Cl. .............. 250/504 R; 250/454.11; 250/455.11; 250/493.1; 250/494.1; 250/505.1; 313/485; 313/486; 355/113

(58) Field of Classification Search ................ None
See application file for complete search history.

(56) References Cited

U.S. PATENT DOCUMENTS

| 6,188,471 | B1 * | 2/2001 | Jung et al. | 356/73 |
| 6,305,818 | B1 * | 10/2001 | Lebens et al. | 362/184 |
| 6,357,893 | B1 * | 3/2002 | Belliveau | 362/285 |
| 6,714,288 | B2 * | 3/2004 | Cohen | 356/71 |
| 7,485,883 | B2 * | 2/2009 | Gardner, III | 250/504 R |

* cited by examiner

*Primary Examiner*—David A Vanore

(57) ABSTRACT

This invention provides a small form factor apparatus for selectively producing one or more of a plurality of wavelength distributions of radiation, comprising a UV Light Emitting Diode (LED) as the primary UV LED radiation source and one or more wavelength transforming (WT) materials separated from the primary UV LED radiation source, that in response to irradiation by the primary UV LED radiation source, produce transformed radiation having a wavelength distribution that is different from the wavelength distribution of the primary UV LED radiation source. None, one, or more than one of the various WT materials may be selected by the user, to allow either the primary UV radiation, or the transformed radiation, or both simultaneously, to be to be emitted from the apparatus in a preferred direction.

12 Claims, 4 Drawing Sheets

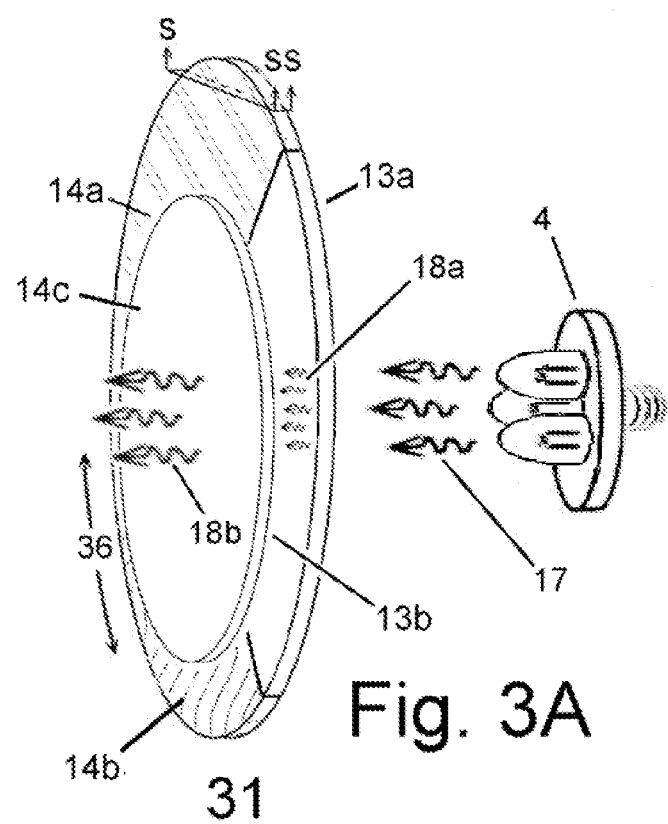
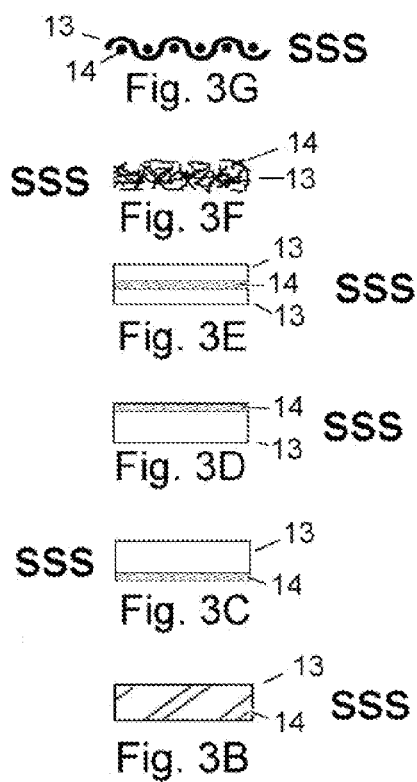

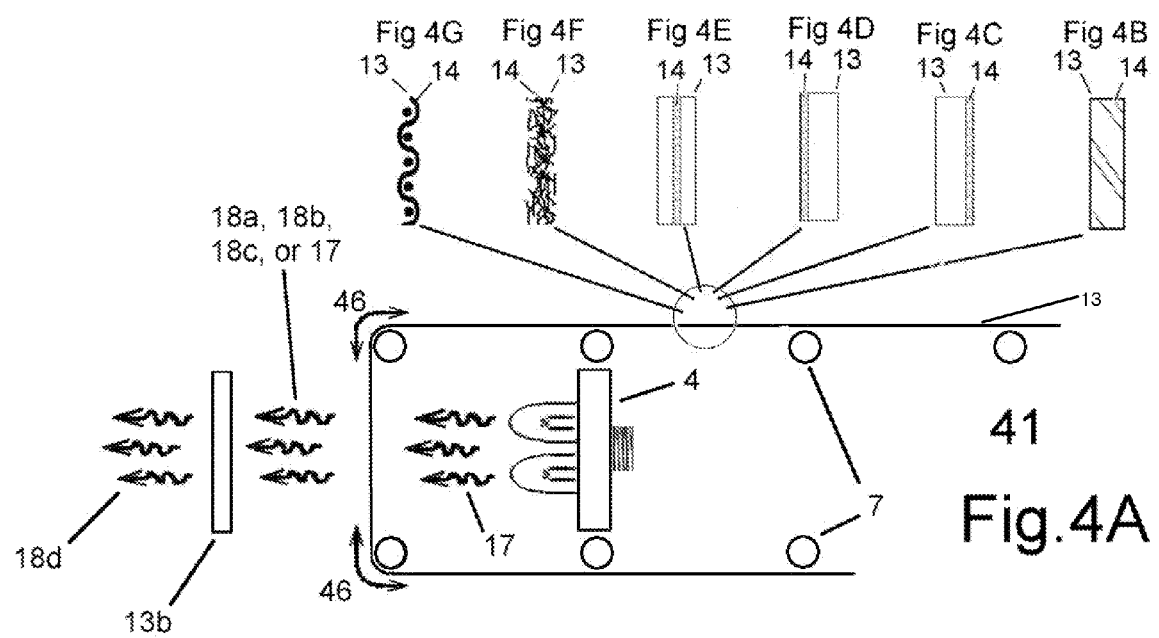
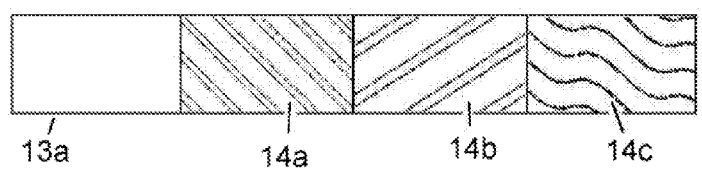

PORTABLE WAVELENGTH TRANSFORMING CONVERTER FOR UV LEDS

CROSS-REFERENCE TO RELATED APPLICATIONS

This application is a continuation-in-part of pending non-provisional U.S. application Ser. No. 11/483,931 Titled VARIABLE WAVELENGTH RADIATION SOURCE, filed Jul. 10, 2006, and which is incorporated by reference in its entirety herein for all purposes. This application is a continuation-in-part of provisional U.S. application Ser. No. 60/888,755 Titled PORTABLE WAVELENGTH TRANSFORMING CONVERTER FOR UV LEDS, filed Feb. 7, 2007, and is incorporated by reference in its entirety herein for all purposes

FIELD OF THE INVENTION

The present invention relates to ultraviolet radiation (UV) emitting devices used in the fields of mineralogy; scientific research; forensics; UV sterilization of food, water, air, fluids, and surfaces; area illumination; photo-chemistry, photo-medical treatments, photo-lithography, artistic displays of fluorescent materials; and similarly related fields. Specifically, the present invention provides a method and device whereby the primary wavelength distribution of radiation being emitted from a primary UV radiation source such as a UV Light Emitting Diode (LED) may be transformed into a secondary wavelength distribution of radiation that is different from the primary wavelength distribution of radiation.

BACKGROUND OF THE INVENTION

The electromagnetic spectrum ranges from cosmic rays at one end, to radio waves at the other end. The ultraviolet (UV) region of the electromagnetic spectrum is situated between visible light and x-rays, with the wavelengths of the UV A radiation being shorter and more energetic than violet visible light and the wavelengths of vacuum UV radiation being slightly longer and less energetic than x-rays. The full UV radiation spectrum ranges from wavelengths of about 100 nanometers (nm) to 400 nanometers and the UV radiation spectrum is usually divided into 4 sections; vacuum UV radiation (also called far or very UV, from 100 nm to about 200 nm), UV C radiation (also called germicide or short-wave UV, from 200 to about 280 nm), UV B radiation (also called mid-wave or medium-wave UV, from 280 nm to about 320 nm), and UV A radiation (also called "poster lamp", black-light, or long-wave UV, from 320 nm to 400 nm).

UV radiation can be emitted from a variety of sources such as light emitting diodes (LED's), lasers, electric arcs (especially as in arc welding), xenon bulbs, halogen bulbs, excimer bulbs, and mercury vapor lamps/tubes of low, medium and high pressures. UV C radiation is used extensively for sterilization, purifying, and deodorizing applications in food, air, water, and general surface sterilization processes because the UV C radiation not only deactivates micro-organisms such as: bacteria, molds, spores, fungi, and viruses (by direct irradiation which damages the DNA such that the micro-organisms cannot reproduce), but the UV C radiation also breaks down the chemical bonds of alcohols, pesticides, chloramines, and other contaminants such as NDMA or MTBE. UV B radiation is the agent that causes human skin to "sun-burn" and the UV B radiation is needed to start the suntanning process. The lamps/tubes used in suntanning booths usually emit a combination of UV B and UV A. UV B is also used extensively in various medical treatments—especially for skin diseases. UV A radiation is used for special effect lighting, suntanning, photo-lithotropy, and photo-chemistry.

U.S. Pat. No. 6,787,782 teaches a system that uses UV radiation emitting LED's as one source of UV radiation for sterilizing air in a vehicle such as an airplane. Similarly, U.S. Pat. No. 6,233,748 teaches the use of UV radiation emitting LED's in combination with a reactive surface to sterilize air for breathing inside a helmet. Neither of these two Patents teaches any way to vary or transform the radiation from the UV radiation source.

In U.S. Pat. No. 5,736,744; U.S. Pat. No. 6,670,619; and U.S. Pat. No. 6,911,657, inventor Waluszko describes a wavelength shifting filter as only emitting one particular wavelength distribution of radiation. Waluszko does not teach the use of conversion plates with LED's.

The present invention relates to ultraviolet radiation (UV) emitting devices used in the fields of mineralogy; scientific research; forensics; UV sterilization of food, water, air, fluids, and surfaces; area illumination; photo-chemistry, photo-medical treatments, photo-lithography, artistic displays of fluorescent materials; and similarly related fields. Specifically, the present invention provides a method and device whereby the primary wavelength distribution of radiation being emitted from a primary UV radiation source such as a UV Light Emitting Diode (LED) may be transformed into a secondary wavelength distribution of radiation that is different from the primary wavelength distribution of radiation, and wherein the device comprises a small form factor device, of an LED flashlight type design, suited for carrying in a pocket, or by the hand, and whereby field use of the UV emitting device is very easy and efficient.

SUMMARY OF THE INVENTION

One object of the present invention is to provide an apparatus and a method for producing multiple and variable wavelength distributions of ultraviolet (UV) radiation, or visible radiation, comprising a primary UV radiation source, and a system of wavelength transforming (WT hereinafter) materials that allows selecting at will between UV A, UV B, UV C radiation, and visible radiation. The apparatus allows for more than a single WT material to be included within the apparatus, so that combinations of wavelength distributions of transformed radiation may readily be produced.

Another object of the present invention is to provide an apparatus and method for enabling production and emission of UV radiation selectable between UV A, UV B, UV C radiation, and visible radiation in a small form factor device embodied in a handheld LED equipped flashlight type device.

BRIEF DESCRIPTION OF THE DRAWINGS

FIG. 3A is an expanded perspective view of apparatus 31, showing a third embodiment of a variable wavelength radiation source, a UV LED Flashlight, wherein a rotatable disk shaped WT filter 13a has multiple sections which optionally replace the single WT filter 13 shown in FIG. 1 in filtering area 5.

FIGS. 3B, 3C, 3D, 3E, 3F, and 3G, are expanded cross sectional views of a portion of the disk shaped WT filter 13a of apparatus 31, showing variations of the first embodiment where the WT materials 14a, 14b, etc. are coupled differently with the structure of the material comprising the WT filter 13a.

FIG. 4A is a cross sectional view of apparatus 41, showing a second embodiment of a variable wavelength radiation source, a UV LED Flashlight, wherein the WT filter 13a is in the form of a flexible belt comprising a UV transmitting material that is coupled with WT materials 14a, 14b, etc. and also having a section that is not coupled with WT materials 14, wherein apparatus 41 may optionally replace the single WT filter 13 shown in FIG. 1 in filtering area 5.

FIGS. 4B, 4C, 4D, 4E, 4F, and 4G, are expanded cross sectional views of a portion of the disk shaped WT filter 13 a of apparatus 41, showing variations of the first embodiment where the WT materials 14a, 14b, etc. are coupled differently with the structure of the material comprising the WT filter 13a.

FIG. 4H is a plan view of the WT filter 13a configured as a flexible belt having multiple sections containing different WT materials and also having a section that is not coupled with WT materials 14a, 14b, etc.

DETAILED DESCRIPTION OF THE INVENTION

Figure 1:
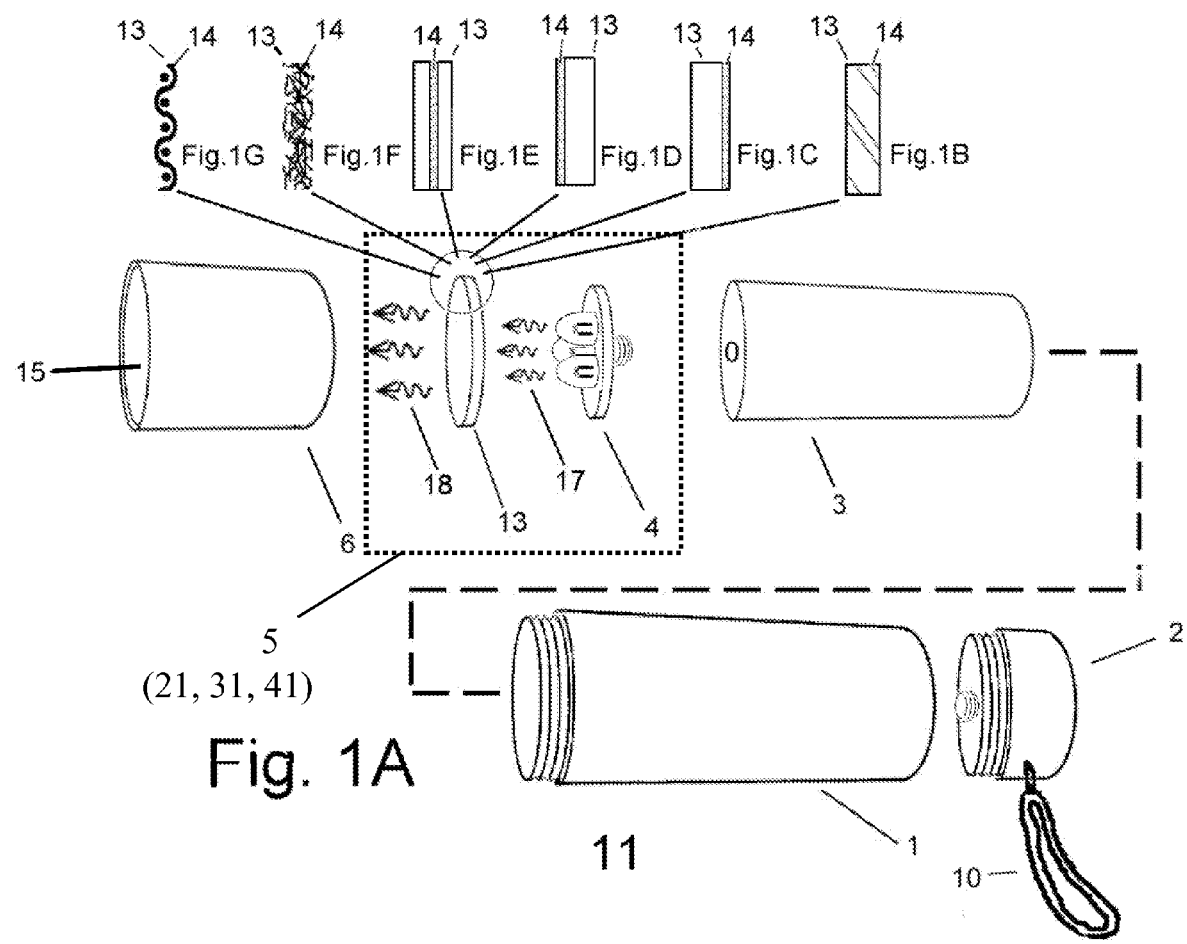
FIG. 1A is an exploded perspective view showing a first embodiment of a variable wavelength radiation source, a UV LED Flashlight, apparatus 11, wherein a disk shaped WT filter 13 is coupled with WT materials 14 (as shown in FIGS. 1B-1G) and selection of the radiation to be emitted 18 is made via placing the WT filter 13 between the primary UV radiation source 4 and the exit port of the apparatus 15.
FIGS. 1B, 1C, 1D, 1E, 1F, and 1G, are expanded cross sectional views of a portion of the disk shaped WT filter 13 of apparatus 11, showing variations of the first embodiment where the WT materials 14 are coupled differently with the structure of the material comprising the WT filter 13.

For the purposes of this invention, it will be understood that the primary UV radiation source is one or more UV light emitting diodes (LED's), and where reference is made to such primary UV radiation source it will be understood to mean an LED source. The WT materials (14-14n below) of any preferred embodiments may comprise any material or system that absorbs light of one wavelength or band of wavelengths and emits light of another wavelength or band of wavelengths, thus modifying the distribution of spectral density. Such materials or systems include band pass filters, phosphors and include also such materials or systems such as quantum dots whose properties are a combination of bulk properties and their physical particle size. Although the wavelength transforming (WT) materials used in similar applications are typically phosphors, any of a wide variety of WT materials (including phosphors) may be used in this invention without departing from the teaching. Further, the WT materials may have structural properties such that the material is self supporting, or the WT materials may need to be supported by a structural member—i.e. the filter (13-13n below). If support is needed, the WT materials may be coupled to either side of a UV transmitting support surface, bonded between UV transmitting support surfaces, sandwiched between two layers of UV transmitting materials, or the WT material may be disposed internally to the UV transmitting support material. Further, the WT material may be incorporated into a fiber and then constructed into a mat of fibers (similar to fiber-glass matting) or the material may be woven into a screen (similar to fiber-glass cloth).

If the WT filter is to be hard and rigid, the material comprising the WT filter can be chosen from the group of materials that includes but is not limited to: natural or synthetic fused quartz or quartz glass, borosilicate glass, natural or synthetic calcium fluoride (also the other metallic fluorides such as barium, lithium, sodium, magnesium, strontium, and lanthanum fluoride), natural or synthetic sapphire, magnesium oxide, hard glass, lime glass, chemical Pyrex, sapphire glass, or UV transmitting or UV minimizing Plexiglass. If the WT filter is to be flexible, the material comprising it can be a hard material that is fashioned into a mat or woven into a cloth or mesh that can be flexible, or the material can be chosen from the group of flexible materials that include but are not limited to: silicone polymers and fluoropolymers. One such group of fluoropolymers is the Teflon.RTM. family which have acronyms such as ETFE, Tefzel.RTM, PFA, PTFE, FEP and EFEP.

WT radiation is only emitted from the apparatus by WT materials that lie between the primary UV radiation source and the radiation exit port. The selection mechanism enables one or more wavelength distributions of transformed radiation to be chosen for emission from the apparatus. It is also to be understood that two different portions of the WT filter may be placed partially between the primary UV radiation source and the exit port, so that more than one wavelength distribution of transformed radiation may be selected for simultaneous emission from the radiation exit port. In that regard, it is to be understood that a portion of the WT filter may actually be removed, or at least not coupled with a WT material, so that one of the wavelength distributions of radiation that can be emitted is the primary UV radiation itself.

Referring now to the FIGS. 1A through 1G, embodiment 11 of the present invention, provides a means for selectively producing one or more of a plurality of wavelength distributions of radiation. Referring to the filtering area 5, apparatus 11 comprises a primary UV radiation source 4 having a primary wavelength distribution of radiation 17, at least one WT material 14, separated from the primary UV radiation source 4 that, in response to irradiation by the primary UV radiation source 4 causes the apparatus to emit a transformed radiation 18 that is different from the primary UV radiation 17, and having a selection mechanism for placing at least a portion of one or more WT materials 14 between the primary UV radiation source 4 and the radiation exit port 15, such that the selected wavelength distribution of radiation is emitted from the apparatus in a preferred direction. Optionally, a reflector unit may be incorporated within the apparatus, or may be coupled or integral to the surface of the primary UV radiation source 4, to direct the primary UV radiation 17 towards the selected WT material 14. A WT material 14 is positioned between the primary UV radiation source 4 and the radiation exit port 15 of the apparatus 11.

Figure 2:
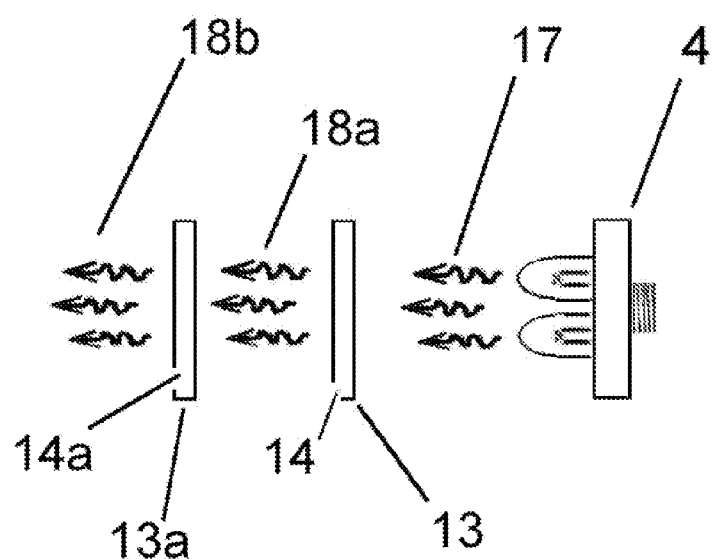
FIG. 2 is a plan view of a portion of apparatus 21, showing a second embodiment, wherein the apparatus 21 contains two disk shaped WT filters 13a and 13b which in an alternate embodiment replace the single WT filter 13 shown in FIG. 1 in filtering area 5.

Referring now to FIG. 2, a second alternate embodiment 21 of the filtering area 5 is shown. In this embodiment a means for selectively producing one or more of a plurality of wavelength distributions of radiation is shown. Referring to the filtering area 5, apparatus 21 comprises a primary UV radiation source 4 having a primary wavelength distribution of radiation 17, at least two WT materials 14 and 14a, separated from the primary UV radiation source 4 that, in response to irradiation by the primary UV radiation source 4 causes the apparatus to emit a transformed radiation 18a, and following a next WT material 14a emit a transformed radiation 18b that is different from the primary UV radiation 17, and having a selection mechanism for placing at least a portion of one or more WT materials 14 between the primary UV radiation source 4 and the radiation exit port 15, such that the selected wavelength distribution of radiation is emitted from the apparatus in a preferred direction. A reflector unit may be incorporated within the apparatus to direct the primary UV radiation 17 towards the selected WT material 14. A WT material 14 is positioned between the primary UV radiation source 4 and the radiation exit port 15 of the apparatus 11. Each of the of the various WT materials 14a, 14b, etc is coupled to or within a WT filter 13 or 13a.

As is shown in FIG. 3A through FIGS. 3B, 3C, 3D, 3E, 3F, and 3G, the third embodiment 31 of the present invention provides a means for selectively producing one or more of a plurality of wavelength distributions of radiation, wherein the WT filter 13, comprises sections 13a-13n is in the form of a flat disk, coupled with various WT materials 14a, 14b, etc. and where selection of the radiation to be emitted 18a or 18b, is via a planar rotational movement 36 of the WT filter 13 with respect to the primary UV radiation source 4. Note that a transparent section may also exist comprising only the WT filter material 13.

FIG. 4A, through FIGS. 4B, 4C, 4D, 4E, 4F, 4G, and 4H, show a 4th embodiment, wherein the WT filter 13a is in the form of a flexible sheet and selection of the radiation to be emitted 18a and/or 18b is made via a combination of rotational and lateral movement 46 of the WT filter 13a about the primary UV radiation source 4 caused by winding the WT filter 13a around cylindrical rollers 7.

Returning to FIG. 1A, the first embodiment as shown by apparatus 11 comprises a housing 1, an end cap 2 with a strap handle 10, a battery 3, a filter housing 6 with a radiation exit port 15, and also a primary UV radiation source (comprised of one or more UV LED's) 4 which emits a primary UV radiation 17 and which is directed toward a disk shaped WT filter 13, that is coupled with WT material 14. Note that the filtering area 5 (representing a functional area), comprising the UV radiation source 4, and the WT filter 13 is actually disposed within the filter housing 6, and as explained below, the alternate embodiments of FIGS. 2-4, apparatus 21, 31 and 41 may optionally be within the filtering area 5 disposed within the filter housing 6. A portion of the disk shaped WT filter 13 may be made transparent to the primary UV radiation 17, to allow untransformed primary UV radiation 17 to be emitted from the radiation exit port 15. Arrows 18 show the transformed radiation 18 being emitted from WT material 14. In this embodiment as shown by apparatus 11, where it is present, WT material 14 is uniformly distributed within the walls of the disk shaped WT filter 13 (or the material comprising the WT filter 13 may have certain WT properties without the addition of any other wavelength transforming material 14).

It is to be understood that the WT material 14 may be coupled with the disk shaped WT filter 13 in several different ways. FIGS. 1B, 1C, 1D, 1E, 1F, and 1G are expanded cross sectional views of a portion of the disk shaped WT filter 13 of apparatus 11, showing variations of the first embodiment where the WT materials 14 are coupled differently with the structure of the material comprising the wall of the disk shaped WT filter 13.

Specifically, FIG. 1B is an expanded view of a portion of the wall of the disk shaped WT filter 13 of apparatus 11, showing a variation wherein the WT material 14 is uniformly distributed in the structure of the material comprising the disk shaped WT filter 13, (or the material comprising the disk shaped WT filter 13 may have certain WT properties without the addition of any other wavelength transforming material 14).

FIG. 1C is an expanded view of a portion of the wall of the disk shaped WT filter 13 of apparatus 11, showing a variation of the first embodiment where the WT material 14 is coupled with the inner surface of the disk shaped WT filter 13.

FIG. 1D is an expanded view of a portion of the wall of the disk shaped WT filter 13 of apparatus 11, showing a variation of the first embodiment where the WT material 14 is coupled with the outer surface of the disk shaped WT filter 13.

FIG. 1E is an expanded view of a portion of the wall of the disk shaped WT filter 13 of apparatus 11, showing a variation of the first embodiment where the WT material 14 is laminated between two supporting materials comprising the disk shaped WT filter 13.

FIG. 1F is an expanded view of a portion of the wall of the disk shaped WT filter 13 of apparatus 11, showing a variation of the first embodiment where the WT material 14 is coupled with wire like shapes that form a mat comprising the material of the disk shaped WT filter 13. The WT material 14 is distributed within the wire like shape. For example, a particular WT material 14 can be mixed into molten UV transmitting glass, which is then formed into a wire like shape, such as that of fiber optic cable. These wires can then be cut into pieces and laid down upon one another to form a mat. The mat can then be formed into various shapes including a disk.

FIG. 1G is an expanded view of a portion of the wall of the disk shaped WT filter 13 of apparatus 11, showing a variation of the first embodiment where the WT materials 14 are coupled with wire like shapes that form a woven mesh comprising the material of the disk shaped WT filter 13. As an example, consider a material similar to fiber-glass cloth wherein the individual fibers have WT material 14 included in the composition and the individual fibers are woven into a cloth.

Turning now to FIG. 2, more than one disk shaped WT filter 13 or 13a can be placed within the apparatus 11 within the filtering area 5. Specifically, FIG. 2 shows the second preferred embodiment via a plan view of a portion of apparatus 21, in which there are two disk shaped WT filters 13 and 13a. As in the previous embodiment, the primary UV radiation source is an array of UV LED's 4, which emits a primary UV radiation 17 directed toward a disk shaped WT filter 13, which is coupled with WT material 14. The transformed radiation 18a then passes through the second disk shaped WT filter 13a coupled with WT material 14a and a second transformed radiation 18b is emitted. As in the previous embodiment and as shown by FIGS. 1B through 1G, the WT material 14, may be coupled with the disk shaped WT filter 13 in several different ways. As previously explained, in this embodiment, the filtering area 5 (representing a functional area), comprises the UV radiation source 4, and the WT filter 13 and 13a of apparatus 21 rather than the single WT filter shown in FIG. 1, and wherein apparatus 21 will be disposed within the filter housing 6.

FIG. 3A is a perspective view showing a third embodiment of the present invention wherein a WT filter 13a may be used to select the transformed radiation 18a or 18b to be emitted from apparatus 31, via a planar rotational movement 36 of the WT filter 13a with respect to the primary UV radiation source 4. As in the previous embodiment, the primary UV radiation source 4 is an array of UV LED's, which emit a primary UV radiation 17 directed toward a disk shaped WT filter 13a, which is coupled with WT material 14a and 14b. Additionally, a portion of the WT filter 33 may be removed or not coupled with WT materials 14a, or 14b in such a way as to allow untransformed UV radiation 17 to be emitted from the apparatus 31. An optional second disk shaped WT filter 13b, coupled with WT material 14c may be used to emit a second transformed radiation 18b. As previously explained, in this embodiment, the filtering area 5 (representing a functional area), comprises the UV radiation source 4, and the disc shaped WT filter 13 and 13a of apparatus 31 rather than the single WT filter shown in FIG. 1, and wherein apparatus 31 will be disposed within or congruent with the filter housing 6

As in the previous embodiment and as shown by FIGS. 3B through 3G, the WT materials 14*a* and 14*b*, may be coupled with the disk shaped WT filter 13*a* in several different ways. FIGS. 3B, 3C, 3D, 3E, 3F, and 3G, are expanded cross sectional views of a portion of the flat WT filter 13*a* of apparatus 31 taken on the plane S-S-S, showing variations of the second embodiment where the WT materials 14*a* and 14*b* are bonded, fused, glued, blended, conjoined, fastened, united, merged, joined, integrated, or otherwise coupled in a plurality of ways with the UV transparent material comprising the WT filter 13*a*.

FIG. 4A is a plan view of a fourth embodiment of the present invention as shown by apparatus 41, wherein the flexible belt WT filter 13 is in the form of a flexible sheet and selection of the transformed radiation to be emitted—18*a*, 18*b*, 18*c*, or untransformed primary UV radiation 17 is made via a combination of rotational and lateral movement 46 of the WT filter 13*a* about the primary UV radiation source 4 caused by directing the WT filter 13*a* around cylindrical rollers 7. An optional WT filter 13*b* may be used to emit additionally transformed radiation 18*d*. As previously explained, in this embodiment, the filtering area 5 (representing a functional area), comprises the UV radiation source 4, and the flexible belt WT filter 13 and WT filter 13*b* of apparatus 41 rather than the single WT filter shown in FIG. 1, and wherein apparatus 41 will be disposed within or congruent with the filter housing 6

FIGS. 4B, 4C, 4E, 4F, and 4G, are cross sectional views of a portion of the WT filter 13, and as previously described show variations of the third embodiment where the WT materials 14*a*, 14*b*, and 14*c* are bonded, fused, glued, blended, conjoined, fastened, united, merged, joined, integrated, or otherwise coupled in a plurality of ways with the UV transparent material comprising the WT filter 13.

FIG. 4H is a plan view of the flexible WT filter 13*a* showing that sections of the WT filter 13*a* have WT materials 14*a*, 14*b*, and 14*c* and a section of the WT filter 13*a* that is not coupled with any WT materials 14.

In alternate embodiments, rather than the small form factor LED flashlight depicted in FIGS. 1 & 2, the LED flashlight may further comprise larger flashlight type devices on the order of a multi-d cell flashlight, or a lantern type LED device utilizing larger power sources such as 6 volt lantern batteries. Such variations would be in keeping with the intent and spirit of the present invention, a cheap, easily manufactured, portable device for selectable UV radiation emission.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow. It will doubtless be obvious to those of ordinary skill in the art that there are other embodiments employing these principles that are not described in detail herein.

I claim:

1. A portable LED apparatus for selectively emitting one or more of a plurality of wavelength distributions of radiation, comprising:
   a primary UV LED radiation source, disposed in a housing, wherein said primary UV LED radiation source produces a primary wavelength distribution;
   at least one wavelength-transforming material, deposed external to the envelope of said primary UV LED radiation source, that in response to irradiation by said primary UV LED radiation source, emits a transformed radiation; and
   wherein said housing further comprises a battery coupled to said primary UV LED radiation source.

2. The apparatus of claim 1 further comprising a wavelength transforming filter, wherein said wavelength transforming filter supports and is combined with said at least one wavelength-transforming material.

3. The apparatus of claim 2 wherein said wavelength transforming filter is in the shape of a substantially flat rotatable disk disposed opposite to and sequentially after said primary UV LED radiation source.

4. The apparatus of claim 2 wherein said wavelength transforming filter is in the shape of a movable flexible belt disposed opposite to and sequentially after said primary UV LED radiation source.

5. The apparatus of claim 2 further comprising at least one additional wavelength-transforming material, deposed external to the envelope of said primary UV LED radiation source, that in response to irradiation by said primary UV LED radiation source, emits a second transformed radiation, wherein said at least one additional wavelength-transforming material is supported by and combined with said wavelength transforming filter.

6. The apparatus of claim 1 wherein said wavelength transforming filter comprises a plurality of wavelength transforming filters, wherein each of said plurality of wavelength transforming filter supports and is combined with said at least one wavelength-transforming material, said plurality of wavelength transforming filters being selectably disposed within said housing.

7. A method for providing a portable LED apparatus for selectively emitting one or more of a plurality of wavelength distributions of radiation, comprising the steps of:
   providing a primary UV LED radiation source, disposed in a housing, wherein said primary UV LED radiation source produces a primary wavelength distribution;
   providing at least one wavelength-transforming material, deposed external to the envelope of said primary UV LED radiation source, that in response to irradiation by said primary UV LED radiation source, emits a transformed radiation; and
   providing a battery disposed with said housing further and coupled to said primary UV LED radiation source.

8. The method for providing a portable LED apparatus as set forth in claim 7 further comprising the step of providing a wavelength transforming filter, wherein said wavelength transforming filter supports and is combined with said at least one wavelength-transforming material.

9. The method for providing a portable LED apparatus as set forth in claim 8 wherein said wavelength transforming filter is in the shape of a substantially flat rotatable disk disposed opposite to and sequentially after said primary UV LED radiation source.

10. The method for providing a portable LED apparatus as set forth in claim 8 wherein said wavelength transforming filter is in the shape of a movable flexible belt disposed opposite to and sequentially after said primary UV LED radiation source.

11. The method for providing a portable LED apparatus as set forth in claim 8 further comprising the step of providing at least one additional wavelength-transforming material, deposed external to the envelope of said primary UV LED radiation source, that in response to irradiation by said primary UV LED radiation source, emits a second transformed radiation, wherein said at least one additional wavelength-transforming material is supported by and combined with said wavelength transforming filter.

12. The method for providing a portable LED apparatus as set forth in claim 7 wherein the step of providing said wavelength transforming filter further comprises the step of providing a plurality of wavelength transforming filters, wherein each of said plurality of wavelength transforming filter supports and is combined with said at least one wavelength-transforming material, said plurality of wavelength transforming filters being selectably disposed within said housing.

\* \* \* \* \*